United States Patent [19]
Linhart

[11] 3,799,624
[45] Mar. 26, 1974

[54] MANUALLY OPERABLE APPARATUS FOR CUT-OUT OF BRAKE PIPE PRESSURE MAINTAINING

[75] Inventor: Harry M. Linhart, East McKeesport, Pa.

[73] Assignee: Westinghouse Air Brake Company, Wilmerding, Pa.

[22] Filed: Nov. 30, 1972

[21] Appl. No.: 310,775

[52] U.S. Cl................................. 303/66, 303/18
[51] Int. Cl................................................ B60t 15/36
[58] Field of Search.............. 303/18, 59, 60, 66, 86

[56] References Cited
UNITED STATES PATENTS
2,676,065  4/1954  Gorman et al...................... 303/18
2,889,175  6/1959  May.................................... 303/59

Primary Examiner—Duane A. Reger
Attorney, Agent, or Firm—W. F. Poore; R. W. McIntire

[57] ABSTRACT

This invention relates to a locomotive brake control apparatus that includes a manually operative self-lapping type of engineer's brake valve device having a relay valve device for controlling variations of the pressure in a train brake pipe that extends from the locomotive through each car in the train and manually operable means selectively operable to cut in or out maintaining of the pressure in the train brake pipe, notwithstanding leakage therefrom, by the self-lapping relay valve device of the engineer's brake valve device.

7 Claims, 1 Drawing Figure

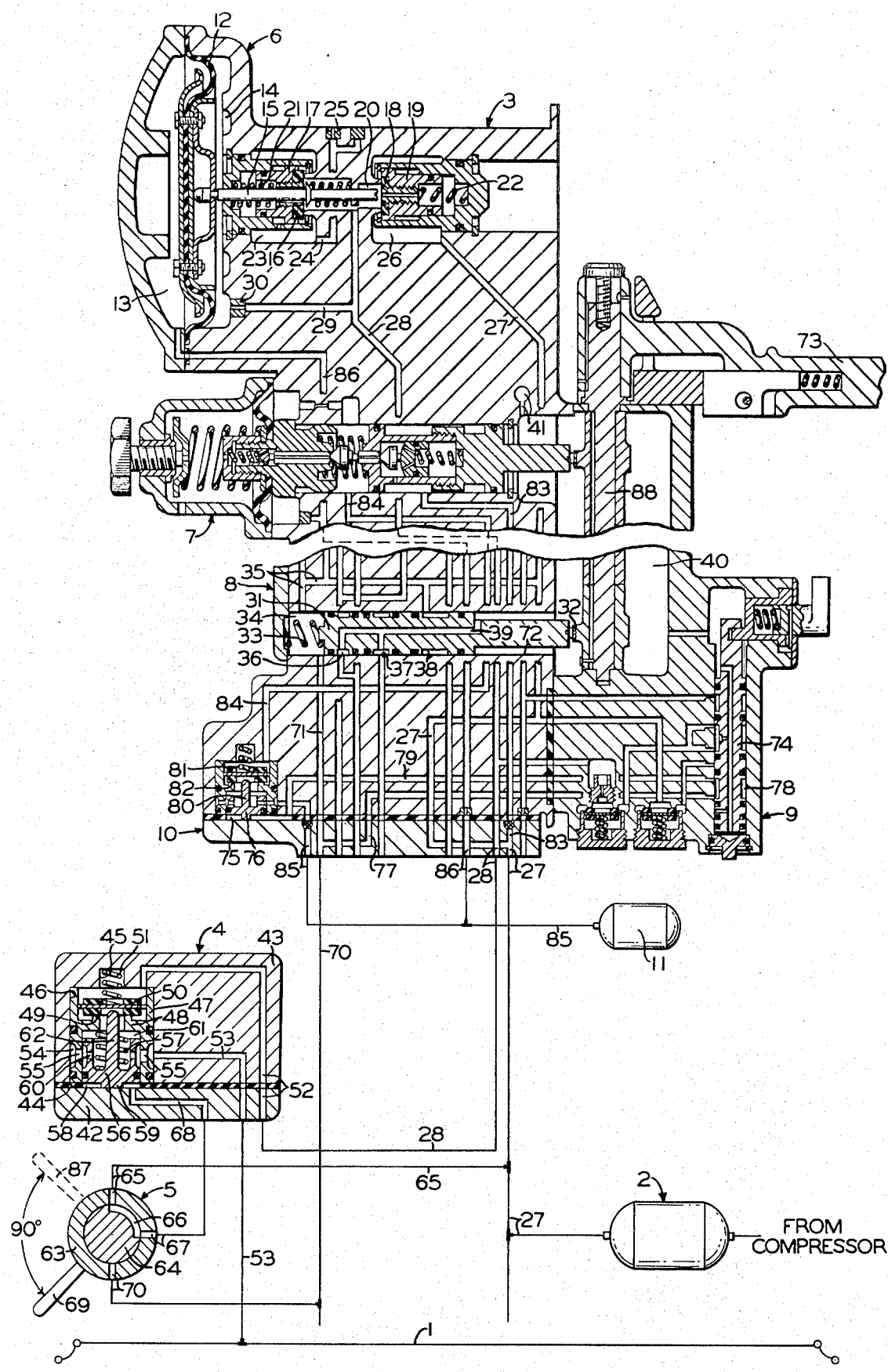

3,799,624

MANUALLY OPERABLE APPARATUS FOR CUT-OUT OF BRAKE PIPE PRESSURE MAINTAINING

BACKGROUND OF THE INVENTION

There is shown in U.S. Pat. No. 2,889,175 issued June 2, 1959 to Harry C. May and assigned to the assignee of the present application, a non-self-lapping type of engineer's brake valve device that includes an equalizing valve device operable, while a brake application is in effect, to maintain substantially constant the reduced pressure in the train brake pipe against leakage of fluid under pressure therefrom, and a selectively operable valve device for cutting in or out the supply of fluid under pressure from a source of fluid under pressure to the equalizing valve device thereby placing brake pipe pressure maintaining at the discretion of the engineer.

A manually operable self-lapping type of engineer's brake valve device, such as is used on most locomotives in serivce on American railroads today, is shown in U.S. Pat. No. 2,958,561 issued Nov. 1, 1960 to Harry C. May and assigned to the assignee of the present application. However, the self-lapping type of engineer's brake valve device disclosed in U.S. Pat. No. 2,958,561 embodies therein no means for placing brake pipe pressure maintaining, while a brake application is in effect, at the discretion of the engineer.

Accordingly, it is the general purpose of this invention to provide a manually operable means for association or use with a self-lapping type of engineer's brake valve device, such as that disclosed in the above-mentioned U.S. Pat. No. 2,958,561, whereby brake pipe pressure maintaining by the supply of fluid under pressure from the self-lapping relay valve device to the train brake pipe, may be manually cut in or out at the discretion of the engineer.

SUMMARY OF THE INVENTION

According to the present invention, there is provided for use with an engineer's brake valve device having a self-lapping relay valve device for controlling variations of pressure in a train brake pipe extending from a locomotive through each car in the train, a manually operable apparatus for selectively, at the discretion of the engineer, rendering the self-lapping relay valve device operative or inoperative to maintain substantially constant the reduced pressure in the train brake pipe, while a brake application is in effect, notwithstanding leakage therefrom. The manually operable apparatus constituting the present invention comprises a check valve operable to an open position to provide for flow of fluid under pressure from the train brake pipe to the self-lapping relay valve device upon operation of this relay valve device to effect a reduction of pressure in the train brake pipe, a fluid pressure operated piston or abutment having a stem for effecting unseating of the check valve in response to the supply of fluid under pressure to one face of the piston to enable the relay valve device to effect a supply of fluid under pressure to the train brake pipe to cause a brake release, and a manually operable valve device by which the engineer may selectively effect the supply of fluid under pressure from a suitable source of fluid under pressure, such as, for example, the main reservoir on the locomotive, directly to the one face of the piston, or to this one face of the piston via the engineer's brake valve device only while it is in its release position.

In the accompanying drawing:

The single FIGURE is a diagrammatic view of a self-lapping type of engineer's brake valve device, shown partly in section, connected by suitable pipes to the usual main reservoir and train brake pipe, and to a novel manually operable apparatus that enables the engineer, at his discretion, to selectively render the self-lapping type of brake valve device operative or inoperative to maintain substantially constant the reduced pressure in the train brake pipe, while a brake application is in effect, notwithstanding leakage of fluid under pressure therefrom.

Referring to the drawing, a locomotive brake control apparatus embodying the invention comprises a brake pipe 1 that extends from end to end of the locomotive and back through each car in a train that may be hauled thereby, a main reservoir 2, a manually-operated engineer's automatic brake valve device 3 for controlling the pressure in the brake pipe 1, a novel brake pipe pressure maintaining cut-in and cut-out valve device 4, and a manually operable valve device 5 for controlling the supply of fluid under pressure from the main reservoir 2 directly to the maintaining cut-in and cut-out valve device 4, or from this reservoir 2 to this cut-in and cut-out valve device 4 via the brake valve device 3 only while the brake valve device 3 is in its release position.

The manually-operated engineer's automatic brake valve device 3 is of the self-lapping type such as that disclosed in U.S. Pat. No. 2,958,561, issued Nov. 1, 1960 to Harry C. May, and assigned to the assignee of the present application.

The brake valve device 3 comprises a self-lapping relay valve device 6, a self-lapping regulating or control valve device 7, a suppression valve device 8, a cut-off valve device 9, and an equalizing reservoir cut-off valve device 10 that is operated to an open position by fluid under pressure supplied thereto while the cut-off valve device 9 occupies the position in which it is shown in the drawing to provide for charging of an equalizing reservoir 11 by the supply of fluid under pressure thereto from the regulating valve device 7.

Relay valve device 6 comprises a diaphragm 12, which is subject opposingly to fluid pressures in a chamber 13 and a chamber 14 and is adapted through the medium of a coaxially arranged operating stem 15 to effect unseating of a disc-shaped exhaust valve 16 carried by an annular valve member 17, or effect unseating of a disc-shaped supply valve 18 carried by a coaxially arranged annular valve member 19, according to whether pressure in chamber 13 is less than or exceeds the pressure in chamber 14. Stem 15 is coaxially connected to the chamber 14 side of diaphragm 12 and projects centrally through valve member 17 and through a chamber 20 and is adapted to abut one end of supply valve member 19. Helical springs 21 and 22 urge the valve members 17 and 18 toward each other for normally concurrently seating the valves 16 and 18. Exhaust valve 16 controls communication between chamber 20 and a chamber 23 which is open to atmosphere via a passageway 24 and an exhaust choke 25, whereas supply valve 18 controls communication between chamber 20 and a supply chamber 26 that is always open to the main reservoir 2 via a passageway and correspondingly numbered pipe 27.

The chamber 20 is connected to the maintaining valve device 4 via a passageway and correspondingly numbered pipe 28 there being disposed in this passageway a brake pipe cut-off valve device (not shown) and a vent valve device (not shown) since these valve devices form no part of the present invention. A passageway 29 in the brake valve device 3 opens at one end into the passageway 28 intermediate the ends thereof and at the other end into the chamber 14 of the relay valve device 6 via a choke 30. It will be understood that the brake pipe cut-off valve device and the vent valve device which are not shown in the drawing operate in the same manner as the cut-off valve device and vent valve device shown and described in the above-mentioned U.S. Pat. No. 2,958,561.

The suppression valve device 8 comprises a spool-type suppression valve 31 that is biased into operative contact with an operating cam 32 by a spring 33 and fluid under pressure supplied to a chamber 34 from the main reservoir 2 via the pipe and passageway 27 and a passageway 35 that at one end opens into the chamber 34 and at the other into the passageway 27 intermediate the ends thereof. Intermediate its ends, the spool valve 31 is provided with three spaced-apart elongated peripheral annular grooves 36, 37 and 38. The grooves 36 and 37 are always open to atmosphere via a passageway 39 in the valve 31 and a chamber 40 in the brake valve device 3 which chamber is open to the exterior of this brake valve device via a passageway 41.

The maintaining valve device 4 may be located in any convenient location on a locomotive and comprises a pipe bracket 42 to which all pipe connections are made and a casing 43 that is secured to the pipe bracket 42 by any suitable means (not shown), there being a gasket 44 constructed of some suitable resilient material, such as, for example rubber, clamped between the pipe bracket 42 and the casing 43 to form a fluid tight seal therebetween. The casing 43 is provided with a bottomed bore 45 and a coaxial counterbore 46 in which is disposed a bushing 47.

Intermediate its ends the bushing 47 has provided integral therewith an inturned flange 48 that has formed on its upper side, as viewed in the drawing, an annular valve seat 49. A flat disc-type valve 50 is normally biased against the annular valve seat 49 by a spring 51 that is interposed between this valve 50 and the upper end of the bottomed bore 45.

While seated on the annular valve seat 49, the valve 50 closes communication between a first passageway 52 in the casing 43 that at one end opens into the upper end of the counterbore 43 and a second passageway 53 in this casing and the pipe bracket 42 that at one end opens at the wall surface of the counterbore 46 intermediate the ends thereof. The first passageway 52 extends through the casing 43 and the pipe bracket 42 and has the hereinbefore-mentioned pipe 28 connected to its outer end. The second passageway 53 extends through the casing 43 and the pipe bracket 42 and is connected by a correspondingly numbered pipe to the train brake pipe 1.

As shown in the drawing, the bushing 47 is provided with an elongated peripheral annular groove 54 that is so located intermediate the ends of this bushing as to register with the one end of the passageway 53 that opens at the wall surface of the counterbore 46 in the casing 43.

Furthermore, the bushing 47 is also provided with a plurality of arcuately spaced ports 55, two of which appear in the drawing, that at one end open at the bottom of the groove 54 and at the other end open into the interior of this bushing. Thus, these ports 55 and the groove 54 provide communication between the passageway 53 and that portion of the interior of the bushing 47 that is below, as viewed in the drawing, the inturned flange 48.

The maintaining valve device 4 further comprises a cup-shaped piston 56 that is slidably mounted in that portion of the bushing 47 that is below the inturned flange 48. Disposed within the cupped portion of the piston 56 and interposed between the inturned flange 48 and the upper side of this piston 56, as viewed in the drawing, is a spring 57 that, in the absence of fluid under pressure in a chamber 58 at the lower side of this piston, is effective to bias a boss 59 formed integral with the lower side of this piston against the upper side of the pipe bracket 42.

As shown in the drawing, the cupped portion of the piston 56 is provided with a plurality of arcuately spaced ports 60 that, while the piston 56 occupies the position shown, are in alignment with the ports 55 in the bushing 47. Thus, while the valve 50 is seated on its seat 49, this valve cooperates with the bushing 47 and the piston 56 to form on the upper side of this piston a chamber 61 that is in communication with the train brake pipe 1 via ports 60 in the cupped portion of the piston 56, ports 55 in the bushing 47 and the passageway and pipe 53.

In order to effect unseating of the valve 50 from its seat 49 in response to the supply of fluid under pressure to the chamber 58 in a manner hereinafter described, the piston 56 has formed integral therewith a stem 62 that extends through the spring 57 and the inturned flange 48 and has its upper end disposed just beneath the valve 50 while it is seated on its seat 49.

The manually operable valve device 5 may be located in the locomotive cab in any place where it is conveniently in the reach of the engineer without him leaving his seat and comprises a body 63 having a bore in which is rotatably mounted a valve element 64. While the valve element 64 occupies the position shown in the drawing, fluid under pressure is supplied from the main reservoir 2 to the chamber 58 below the piston 56 of the maintaining cut-in and cut-out valve device 4 via the pipe 27, a pipe 65 connected at one end to the pipe 27 intermediate the ends thereof and at the opposite end to a correspondingly numbered passageway in the body 63, a groove or cavity 66 in the valve element 64, a passageway 67 in the body 63 and a correspondingly numbered pipe that is connected to one end of a passageway 68 formed in the pipe bracket 42 and and having its opposite end opening into the chamber 58.

The valve element 64 is connected to a two-position handle 69. When this handle 69 is rotated from the position in which it is shown in the drawing clockwise through an arc of 90°, the valve element 64 connects, via the cavity 66, the passageway and pipe 67 to a passageway and correspondingly numbered pipe 70. This pipe 70 is connected to one end of a passageway 71 in the brake valve device 3, it being noted from the drawing, that the other end of this passageway 71 opens into the hereinbefore-mentioned chamber 34 at the wall surface of a bore 72 in which the spool-type suppression valve 31 is slidably mounted at a location that is on the left-hand side of the suppression valve 31 while this valve occupies its release position in which it is shown in the drawing.

OPERATION

To initially charge the locomotive brake control apparatus shown in the drawing, internal combustion engines are started for operating fluid compressors (not shown) to effect charging of the main reservoir 2.

It may be assumed that a handle 73 of the engineer's automatic brake valve device 3 is in its release position in which it is shown and that a spool-type valve 74 of the manually operated cut-off valve device 9 occupies the position shown in the drawing. Therefore, fluid under pressure will flow from the main reservoir 2 to a chamber 75 below a piston 76 of the equalizing reservoir cut-off valve device 10 via pipe and passageway 27, passageway 35, chamber 34, passageway 71, a passageway 77 in the brake valve device 3, an elongated periphral annular groove 78 on the spool-type valve 74 and a second passageway 79 in the brake valve device 3. This supply of fluid under pressure to the chamber 75 is effective to move the piston 76 upward and, via a stem 80, unseat a flat disc-type valve 81 from an annular valve seat 82. Therefore, while the brake valve handle 73 is in its release position, the self-lapping regulating valve device 7 of the brake valve device 3 is effective, as explained in the above-mentioned U.S. Pat. No. 2,958,561, to supply fluid under pressure from the main reservoir 2, which is connected to this regulating valve device 7 via pipe and passageway 27 and a passageway 83, to the equalizing reservoir 11 via a passageway 84 in the brake valve device 3, past the now unseated valve 81 and a passageway and correspondingly numbered pipe 85. Fluid under pressure is simultaneously supplied to the chamber 13 of the relay valve device 6 since this chamber 13 is connected to the pipe 85 by a passageway and correspondingly numbered pipe 86.

It may be further assumed that the handle 69 and valve element 64 of the manually operated valve device 5 occupy the position in which they are shown in the drawing. Therefore, fluid under pressure will flow from the main reservoir 2 to the chamber 58 in the maintaining valve device 4 via pipe 27, pipe and passageway 65, cavity 66, passageway and pipe 67, and passageway 68. This supply of fluid under pressure to the chamber 58 is effective to move the piston 56 and stem 62 upward against the yielding resistance of the spring 57 to unseat valve 50 from its seat 49 against the yielding resistance of spring 51.

Consequently, it is apparent that the fluid under pressure supplied to the chamber 13 of the relay valve device 6 in the manner described above will cause this valve device 6 to operate to effect the supply of fluid under pressure from the supply chamber 26, that is connected to the main reservoir 2 via the passageway and pipe 27, to the chamber 20 from whence it will flow to the train brake pipe 1 via the passageway and pipe 28 having the brake pipe cut-off valve (not shown) therein, passageway 52, past the now unseated valve 50, chamber 61, ports 60 and 55, groove 54, and passageway and pipe 53. Thus, fluid under pressure is supplied from the main reservoir 2 on the locomotive to the train brake pipe 1 until this pipe is fully charged to the pressure normally carried therein as determined by the setting of the regulating valve device 7.

The brake control valves (not shown) on the locomotive and cars in the train will operate in response to the charging of the train brake pipe to effect a release of the brakes on the entire train.

A service or an emergency brake application and a subsequent release on the locomotive and cars in the train may be effected in the usual manner and need not be described in detail herein since such applications and releases are fully described in hereinbefore-mentioned U.S. Pat. No. 2,958,561.

It will be understood that so long as the handle 73 of the engineer's automatic brake valve device 3 occupies its release position, and the handle 69 of the maintaining valve device 4 occupies the position in which it is shown in the drawing, the self-lapping relay valve device 6 is automatically operative to maintain a substantially fully charged constant pressure in the train brake pipe 1 notwithstanding leakage of fluid under pressure therefrom that does not exceed the maximum amount of fluid under pressure that can be supplied per unit of time to the train brake pipe 1 by operation of the self-lapping relay valve device 6.

Now let it be supposed that the handle 69 of the manually operable valve device 5 is manually rotated in a clockwise direction, as viewed in the drawing, through an angle of 90° to a brake pipe pressure maintaining cut-out position indicated by the reference numeral 87. As the handle 69 is thus rotated in a clockwise direction to the position indicated by the reference numeral 87, the valve element 64 is likewise rotated from the position shown in the drawing to a position in which the cavity 66 establishes a communication between the passageway and pipe 67 and the passageway and pipe 70. Upon thus establishing a communication between the passageway and pipe 67 and passageway and pipe 70, fluid under pressure will flow from the main reservoir 2 to the chamber 58 below the piston 56 of the maintaining valve device 4 via pipe and passageway 27, passageway 35, chamber 34, passageway 71, pipe and passageway 70, cavity 66 in valve element 64, passageway and pipe 67 and passageway 68. This supply of fluid under pressure to the chamber 58 is effective to cause the piston 56 to remain in its upper position in which the stem 62 maintains the valve 50 unseated from its seat 40 to thereby establish the hereinbefore-described communication between the chamber 20 of the self-lapping relay valve device 6 and the train brake pipe 1. Therefore, the self-lapping relay valve device 6 is rendered operative to maintain normal fully charged pressure in the train brake pipe 1 notwithstanding leakage therefrom so long as the brake valve handle 73 remains in its release position.

Now let it be supposed that the handle 73 of the brake valve device 3 is manually moved arcuately out of its release position and to any position in its application zone. As the brake valve handle 73 is manually moved arcuately from its release position to any position in its application zone, a cam shaft 88 and the cam 32 mounted thereon are rotated therewith. The contour of the cam 32 is such that this rotation is effective to move the suppression valve 31 against the bias of the spring 33 from the position in which this valve is shown in the drawing in the direction of the left hand to a position in which the groove 36 on this valve 31 registers with the passageway 71.

When the suppression valve 31 is moved to the position in which the groove 36 thereon registers with the passageway 71, fluid under pressure will be vented from the chamber 58 below the piston 56 of the pressure maintaining cut-in and cut-out valve device 4 to atmosphere via passageway 68, pipe and passageway 67, cavity 66, passageway and pipe 70, passageway 71, groove 36 on and passageway 39 in suppression valve 31, chamber 40 and passageway 41.

Upon the release of fluid under pressure from the chamber 58 in the manner just described, the spring 57 is rendered effective to move the piston 56 and stem 62 downward to the position shown in the drawing in which the boss 59 on the lower side of the piston 56 abuts the pipe bracket 42.

As the piston 56 and stem 62 are moved downward by the spring 57 to the position in which they are shown in the drawing, the spring 51 is rendered effective to seat the valve 50 on its seat 49.

With the valve 50 seated on its seat 49, communication is closed between the chamber 20 of the self-lapping relay valve device 6 of the brake valve device 3 and the train brake pipe 1. Therefore, the self-lapping relay valve device 6 is no longer effective to supply fluid under pressure to the train brake pipe 1 upon the occurrence of leakage of fluid under pressure therefrom.

Accordingly, it is apparent from the foregoing that the train brake pipe pressure maintaining by operation of the self-lapping relay valve device 6 of the engineer's automatic brake valve device 3 may be cut out whenever desired by manually moving the handle 69 of the manually operable valve device 5 from the position in which it is shown in the drawing to the position indicated by the reference numeral 87.

It should be noted, however, that while the valve 50 is seated on its seat 49, and the piston 56 and stem 62 occupy the position shown in the drawing, the self-lapping relay valve device 6 is operatively effective to release fluid under pressure from the train brake pipe 1 to atmosphere to cause a brake application on the entire train.

If, while the valve 50 is seated on its seat 49, the handle 73 of the engineer's brake valve device 3 is moved arcuately from whatever position it occupies in a direction away from its release position, the regulating valve device 7 will operate in the manner described in hereinbefore-mentioned U.S. Pat. No. 2,958,561 to effect a reduction of the pressure in the equalizing reservoir 11 and the chamber 13 of the relay valve device 6.

As the pressure in the chamber 13 is reduced, the higher brake pipe pressure in the chamber 14 will deflect the diaphragm 12 in the direction of the left hand, as viewed in the drawing. As the diaphragm 12 is thus deflected in the direction of the left hand, it is effective, via the stem 15, to unseat exhaust valve 16 thereby establishing communication between the chamber 20 and the chamber 23 which is open to atmosphere via the passageway 24 and exhaust choke 25.

Fluid under pressure will now flow from the upper side of valve 50 in maintaining cut-in and cut-out valve device 4 to atmosphere via passageway 52, pipe and passageway 28, chamber 20, past now unseated exhaust valve 16, chamber 23, passageway 24 and choke 25. As fluid under pressure is thus released from the upper side of valve 50, the higher pressure in the chamber 61 will move valve 50 upward from its seat 49 against the yielding resistance of the spring 51.

Upon the unseating of the valve 50 from its seat 49 in the manner just described, fluid under pressure will flow from the train brake pipe 1 to atmosphere via pipe and passageway 53, groove 54 on and ports 55 in bushing 47, ports 60 in the cupped portion of the piston 56, chamber 61, past the now unseated valve 50, passageway 52, pipe and passageway 28, chamber 20, past now unseated exhaust valve 16, chamber 23, passageway 24 and choke 25.

It will be noted that the chamber 14 at the right-hand side of the diaphragm 12 is connected to the passageway 28 via the choke 30 and passageway 29. Therefore, fluid under pressure will be released from the chamber 14 to atmosphere simultaneously as it is released from the train brake 1. Accordingly, fluid under pressure will be released from the train brake pipe 1 and the chamber 14 to atmosphere until the pressure in the chamber 14 is reduced to a value that is slightly less than the equalizing reservoir pressure present in the chamber 13 whereupon the spring 21 is rendered effective to move the annular valve member 17 and the exhaust valve 16 in the direction of the right hand to seat this exhaust valve 16 and thereby terminate further flow of fluid under pressure from the chamber 14 and the train brake pipe 1 to atmosphere.

From the foregoing, it is apparent that, subsequent to movement of the handle 69 of the manually operable valve device 5 to the position indicated by the reference numeral 87 to cut out brake pipe pressure maintaining by the relay valve device 6 of the brake valve device 3, the handle 73 of this brake valve device 3 may be moved from whatever position is occupies in a direction away from its release position to cause the self-lapping relay valve device 6 to operate to release fluid under pressure from the train brake pipe 1 to atmosphere and thereby effect a brake application on the entire train. Thus, the engineer in the cab of the locomotive retains control of the train at all times and may, at his discretion, effect a brake application on the entire train notwithstanding that brake pipe pressure maintaining by the relay valve device 6 of the engineer's automatic brake valve device 3 is cut out. It should be noted, however, that a direct release of such a brake application can be effected by the return of the handle 73 of the brake valve device 3 to its release position, since, upon return of the handle 73 to its release position, the suppression valve 31 will be returned to its release position in which it is shown in the drawing.

Upon the return of the suppression valve 31 to its release position, the fluid under pressure supplied from the main reservoir 2 to the chamber 34 via the pathway hereinbefore described, will flow from this chamber 34 to the chamber 58 in the maintaining valve device 4 via passageway 71, pipe and passageway 70, cavity 66, passageway and pipe 67 and passageway 68.

Upon this supply of fluid under pressure to the chamber 58, the piston 56 and stem 62 will be moved upward to unseat valve 50 from its seat 49. Since the handle 73 of the brake valve device 3 has been returned to its release position, the self-lapping relay valve device 6 will now supply fluid under pressure to the train brake pipe 1 via the unseated valve 50 until the train brake pipe is fully charged to the normal pressure carried therein. This charging of the train brake pipe effects a release of the brakes on the entire train.

Having now described the invention, what I claim as new and desire to secure by Letters Patent, is:

1. A locomotive brake control apparatus for controlling the brakes on the locomotive and the cars in a train, the combination of:
   a. a normally charged brake pipe, variations of the fluid pressure in which are effective to control brake applications and brake releases on the locomotive and cars,
   b. a normally charged main reservoir,
   c. a normally charged equalizing reservoir,
   d. a brake valve device having:
      i. a self-lapping relay valve device which is subject to the opposing pressures in said equalizing reservoir and said brake pipe and is operative by the differential of the pressures in said equalizing reservoir and in said brake pipe to effect the supply of fluid under pressure from said main reservoir to said brake pipe to control and maintain the pressure therein notwithstanding leakage of fluid under pressure therefrom,
      ii. control valve means operative to effect the supply of fluid under pressure from said main reservoir to said equalizing reservoir to control the pressure therein, and
      iii. a multi-position valve which in one position, effects the supply of fluid under pressure from said main reservoir to a passageway and in the other of its positions, opens said passageway to atmosphere, wherein the improvement comprises:
   e. a brake pipe pressure maintaining cut-in and cut-out valve device interposed between said self-lapping relay valve device and said brake pipe, said brake pipe pressure maintaining cut-in and cut-out valve device comprising:
      i. one-way flow valve means alway operable to provide for flow of fluid under pressure in the direction from said brake pipe to said self-lapping relay valve device, and
      ii. movable abutment means operable in response to the supply of fluid under pressure thereto to hold said one-way flow valve means unseated to enable flow therepast in both directions whereby fluid under pressure may flow in the direction from said self-lapping valve device to said brake pipe to cause said self-lapping relay valve device to maintain a substantially constant pressure in said brake pipe notwithstanding leakage of fluid under pressure therefrom, and
   f. a manually operable valve means selectively operable from one position in which it establishes a direct communication between said main reservoir and said movable abutment means independently of said multi-position valve to another position in which it establishes a communication between said passageway and said movable abutment means whereby fluid under pressure is supplied to said movable abutment means only while said multi-position valve occupies its said one position thereby rendering said multi-position valve operable upon movement to any one of its other positions to release fluid under pressure from said movable abutment means to cause said one way flow valve means to cut off flow in the direction from said self-lapping relay valve device to said brake pipe thereby terminating maintaining a substantially constant pressure in said brake pipe notwithstanding the loss of fluid under pressure therefrom.

2. A locomotive brake control apparatus, as recited in claim 1, further characterized in that said one-way flow valve means comprises:
   a. an annular valve seat,
   b. a valve, and
   c. a spring for normally biasing said valve against said annular valve seat, and said movable abutment means comprises:
      a. a piston, and
      b. a stem formed integral with one face of said piston and arranged coaxial with said valve whereby said stem effects unseating of said valve from said seat in response to the supply of fluid under pressure to the other face of said piston.

3. A locomotive brake control apparatus, as recited in claim 1, further characterized in that said brake valve device comprises manually operable means having a plurality of positions for controlling the operation of said control valve means and the movement of said multi-position valve from any one of its positions to another one of its positions.

4. A locomotive brake control apparatus, as recited in claim 1, further characterized in that said manually operable valve means comprises:
   a. a rotary valve element having a peripheral annular groove through which said communications are established,
   b. a casing having a bore in which said rotary valve element is rotatably mounted, and
   c. a handle secured to said rotary valve element whereby said rotary valve element is actuated by said handle from either one of two positions to the other, said groove in said valve element in one position establishing therethrough one of said communications and in the other position establishing the other of said communications.

5. For use with a brake valve device having a self-lapping type relay valve device for effecting variations of pressure in a train brake pipe and a multi-position valve which, in one of its positions, establishes a communication through which fluid under pressure may be supplied to a passageway and, in the other of its positions, establishes a communication between said passageway and atmosphere, wherein the improvement comprises a two-position manually operable brake-pipe-maintaining cut-in and cut-out apparatus interposed in a communication through which the self-lapping type relay valve device effects the supply of fluid under pressure to the train brake pipe, said two-position manually operable brake-pipe-maintaining cut-in and cut-out apparatus comprising:
   a. a first valve device interposed in the communication through which the self-lapping type relay valve device effects the supply of fluid under pressure to the train brake pipe, said first valve device comprising:
      i. a valve,
      ii. a valve seat for said valve, said valve and valve seat being so arranged that said valve is always movable away from said seat to establish a communication between the train brake pipe and the self-lapping relay valve device upon operation of the relay valve device to effect a decrease in the pressure in the train brake pipe, and
      iii. movable abutment means operable in response to the supply of fluid under pressure thereto to hold said valve unseated from said seat to provide for flow of fluid under pressure therepast in both directions to enable said relay valve device to effect both an increase and a decrease in pressure in the train brake pipe, and b. a second valve device manually operable selectively from a first position in which it establishes a first communication through which fluid under pressure may be supplied from said passageway to said movable abutment means to cause unseating of said valve thereby, while said multi-position valve is in its said one position, rendering the relay valve device effective to cause an increase or a decrease in the pressure in the train brake pipe and maintain any selected pressure in the train brake pipe substantially constant notwithstanding loss of fluid under pressure therefrom, and, while said multi-position valve is in any of its said other positions, rendering the relay valve device effective to cause only a decrease in the pressure in the train brake pipe, to a second position in which it establishes a second communication through which fluid under pressure may be supplied to said movable abutment independently of said passageway thereby rendering the relay valve device effective to cause either an increase or a decrease in the pressure in the train brake pipe irrespective of the position of said multi-position valve.

6. A two-position manually operable brake pipe pressure maintaining cut-in and cut-out apparatus, as claimed in claim 5, further characterized in that said first valve device further comprises:

a. a casing having a bottomed bore and a plurality of passageways extending therethrough that at one end open into said bottomed bore and at the other end open at the exterior surface of said casing, and b. a hollow cylindrical member disposed in said bottomed bore and having intermediate its ends an inturned annular flange on one side of which is formed said valve seat, and in that said movable abutment comprises a piston slidably mounted in said hollow cylindrical member on the side of said inturned annular flange opposite said valve seat, said piston having integral with one side thereof a stem to effect unseating of said valve from said valve seat upon the supply of fluid under pressure to the other side of said piston.

7. A two-position manually operable brake pipe pressure maintaining cut-in and cut-out apparatus, as claimed in claim 5, further characterized in that said second valve device comprises:

a. a casing having a bore and a plurality of passageways extending therethrough that at one end open into said bore and at the other open at the exterior surface of said casing, b. a cylindrical valve element rotatably mounted in said bore and having a peripheral annular groove thereon, and c. manually operable means for effecting rotation of said cylindrical valve element from one position in which said peripheral annular groove establishes a communication between a pair of said plurality of passageways in said casing to another position in which said groove establishes a communication between one of said pair of passageways and another of said plurality of passageways in said casing.

* * * * *